Sept. 19, 1939.   W. L. McGRATH   2,173,809
LOAD COMPENSATED CONTROL SYSTEM
Filed Nov. 23, 1936
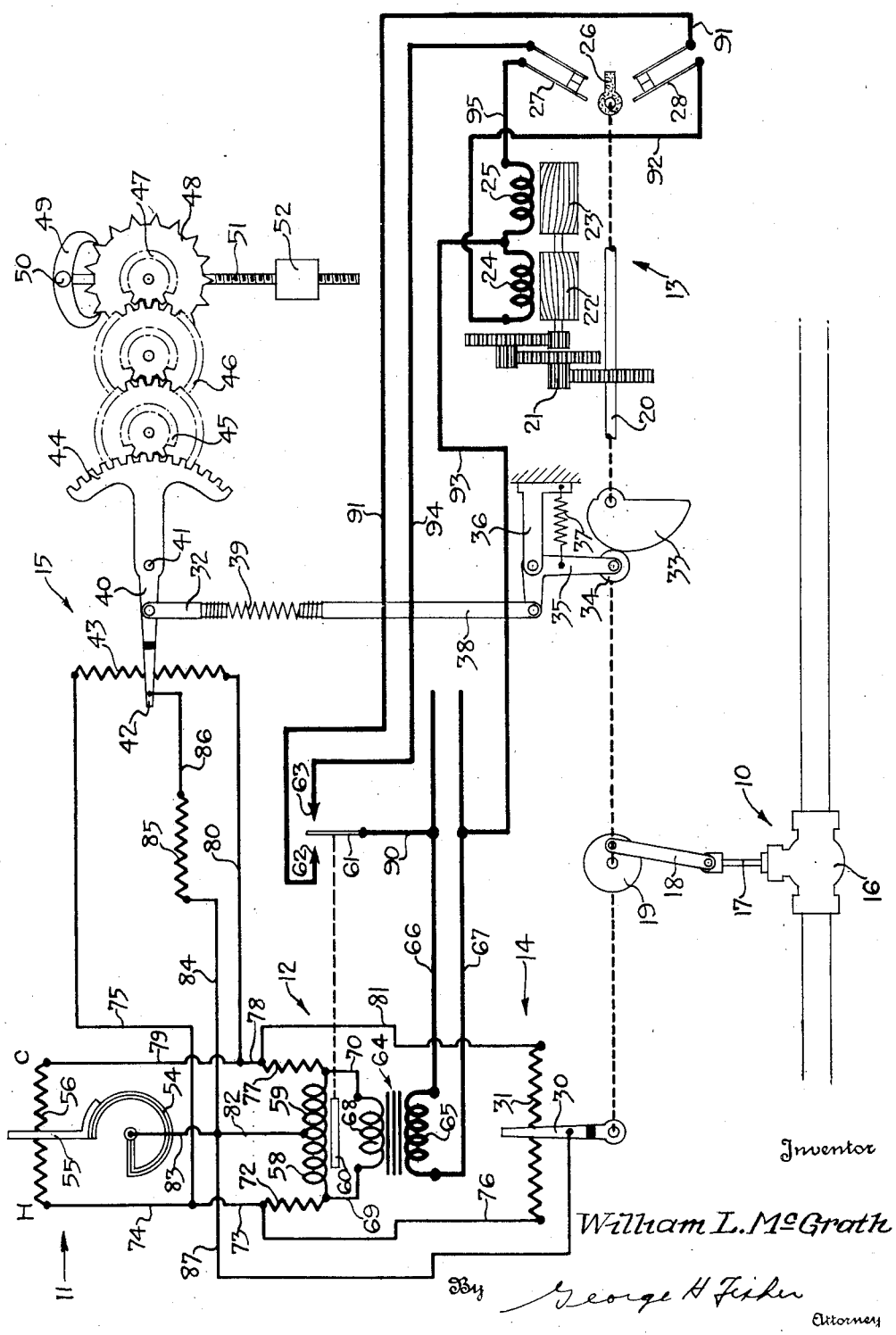
Inventor
William L. McGrath
By George H. Fisher
Attorney Patented Sept. 19, 1939

2,173,809

UNITED STATES PATENT OFFICE 2,173,809

LOAD COMPENSATED CONTROL SYSTEM

William L. McGrath, St. Paul, Minn., assignor to Minneapolis-Honeywell Regulator Company, Minneapolis, Minn., a corporation of Delaware Application November 23, 1936, Serial No. 112,330

12 Claims. (Cl. 236—74)

This invention relates to automatic load compensation or reset mechanisms in general and more particularly to that type of mechanism as applied to a follow-up control system.

An object of this invention is to provide a follow-up control system for controlling the value of a condition along with a novel reset or load compensation mechanism for maintaining the value of the condition to be controlled at the desired normal value regardless of changes in load.

Another object of this invention is to provide a reset mechanism for a device which controls the value of a condition comprising a resilient means for operating the reset mechanism along with a novel escapement mechanism for retarding the operation of the reset mechanism.

Other objects and advantages will become apparent to those skilled in the art upon reference to the accompanying specification, claims and drawing.

For a more thorough understanding of this invention, reference is made to the accompanying single sheet of drawings in which is diagrammatically shown the preferred form of this invention.

Referring now to the drawing, a device to be positioned in a plurality of positions for controlling the value of a condition is generally indicated at 10. Control means the state of which is varied in accordance with changes in the value of the condition to be controlled is generally indicated at 11. The control means 11 is adapted to operate a relay generally designated at 12. The relay 12 positions a motor generally designated at 13 which, in turn, positions the device 10 and operates a follow-up mechanism generally designated at 14. The follow-up mechanism 14 also acts upon the relay 12 to provide a follow-up control system. A reset mechanism generally designated at 15 also acts upon the relay 12 to reposition or reset the device 10 in accordance with changes in load whereby the value of the condition to be controlled is maintained at a desired normal value regardless of changes in load.

Although the control system of this invention may be utilized for controlling any desired condition, it is disclosed for purposes of illustration as controlling a temperature condition and more particularly the temperature of a space (not shown). Therefore, the device 10 is shown to be a valve 16 for controlling the supply of heating fluid to the space. The valve 16 may be operated by a valve stem 17 which is connected by a pitman 18 to a crank disk 19 carried by a shaft 20 of the motor 13. The shaft 20 is operated through a reduction gear train 21 by motor rotors 22 and 23. The motor rotors 22 and 23 are operated by field windings 24 and 25, the arrangement being such that when the field winding 24 is energized, the valve 16 is moved toward an open position and when the field winding 25 is energized, the valve 16 is moved toward a closed position. The shaft 20 also carries an abutment member 26 preferably made of insulating material for opening limit switches 27 and 28 when the valve 16 is moved to either an extreme closed position or an extreme open position, respectively.

The shaft 20 also operates a slider 30 which is adapted to slide across a potentiometer resistance element 31. The slider 30 and the resistance element 31 form a balancing potentiometer for the relay 12, the operation of which will be pointed out more fully hereafter. When the valve 16 is moved toward an open position, the slider 30 is moved toward the left and when the valve 16 is moved toward a closed position, the slider 30 is moved toward the right.

The shaft 20 also operates a cam 33 which is engaged by a cam follower 34 carried by a bell crank lever 35. The bell crank lever is suitably pivoted on a stationary support 36 and a spring 37 holds the cam follower 34 in engagement with the cam 33. The bell crank lever 35 operates an arm 38 which is connected to one end of a combination tension and compression spring 39. The other end of the combination compression and tension spring is connected to an arm 32 which is, in turn, connected to a lever 40. The lever 40 is suitably pivoted upon a stationary pivot 41 and carries a slider 42 which is adapted to slide across a potentiometer resistance element 43. The slider 42 and the resistance element 43 form a compensating potentiometer for the relay 12. The lever 40 also carries a plurality of teeth 44 which are engaged by a pinion 45. The pinion 45 is connected through a gear train 46 to another pinion 47. The pinion 47 carries an escapement wheel 48 which is adapted to be engaged by a conventional palate lever 49 pivoted on a stationary pivot 50. The palate lever 49 is provided with a pendulum 51 upon which is screw threaded a weight 52. By suitably rotating the weight 52, it may be moved upwardly and downwardly on the pendulum 51 to vary the speed of operation of the palate lever 49.

When the valve 16 is moved toward an open position, the cam 33 is rotated in a counter-clockwise direction and the spring 39 is placed in tension. This places a downward stress on the slider 42 to move the same downwardly but the downward movement of the slider 42 is retarded by the clock escapement mechanism. By suitably adjusting the weight 52, the speed at which the slider 42 moves downwardly may be adjusted. Conversely, upon closing movement of the valve 16, the cam 33 is rotated in a clockwise direction to place the spring 39 under compression to move the slider 42 upwardly. Upward movement of the slider 42, however, is retarded by the clock escapement mechanism and the rate of this upward movement may be adjusted by longitudinally moving the weight 52 with respect to the pendulum 51. When the spring 39 is in a neutral condition, that is, when there is no tension or compression therein, the slider 42 is maintained in its adjusted position.

The control means generally designated at 11 is shown to be a thermostatic control means having a thermostatic element 54 responsive to variations in space temperature. Thermostatic element 54 operates a slider 55 with respect to a potentiometer resistance element 56. The slider 55 and the resistance element 56 form a control potentiometer. Upon a decrease in space temperature, the slider 55 is moved to the right in the direction indicated by the character C and upon an increase in space temperature, the slider 55 is moved to the left in the direction indicated by the character H. When the space temperature is at the desired normal value, the slider 55 assumes a mid position as shown in the drawing, and this represents the normal state of the control means.

The relay generally designated at 12 may comprise relay coils 58 and 59 for operating an armature 60. The armature 60 is suitably connected to a switch arm 61 and is adapted to engage spaced contacts 62 and 63. When the relay coil 58 is energized more than the relay coil 59, the switch arm 61 is moved into engagement with the contact 62, and when the relay coil 59 is energized more than the relay coil 58, the switch arm 61 is moved into engagement with contact 63. When the relay coils 58 and 59 are equally energized, the switch arm 61 is maintained spaced midway between the contacts 62 and 63, as shown in the drawing. Power is supplied to the relay 12 by means of a step-down transformer 64 having a primary 65 connected across line wires 66 and 67 and a secondary 68. One end of the secondary 68 is connected by a wire 59 to the left end of the relay coil 58 and the other end of the secondary 68 is connected by a wire 70 to the right end of the relay coil 59. The adjacent ends of the relay coils 58 and 59 are connected together. By reason of these wiring connections, it is seen that the relay coils 58 and 59 are connected in series and across the secondary 68.

The left end of the relay coil 58 is connected by a protective resistance 72 and wires 73, 74, 75 and 76 to the left end of the control potentiometer resistance element 56, the upper end of the compensating potentiometer resistance element 43 and the left end of the balancing potentiometer resistance element 31. In a like manner, the right end of the relay coil 59 is connected by a protective resistance 77 and wires 78, 79, 80 and 81 to the right end of the control potentiometer resistance element 56, the lower end of the compensating potentiometer resistance element 43 and the right end of the balancing potentiometer resistance element 31. The junction of the relay coils 58 and 59 is connected by wires 82, 83, and 81 to the slider 55 of the control potentiometer and the slider 30 of the balancing potentiometer. The junction of relay coils 58 and 59 is also connected by wires 82 and 84, resistance 85, and wire 86 to the slider 42 of the compensating potentiometer. By reason of these wiring connections, it is seen that the control potentiometer, the balancing poteniometer and the compensating potentiometer are all connected in parallel with each other and with the series connected relay coils 58 and 59.

Omitting for the time being the effect of the compensating potentiometer, it is assumed that the parts are in the position shown in the drawing. The space temperature is at the desired normal value and the valve 16 is in a mid position for supplying just the correct amount of heat to make up for the heat loss from the space. Upon an increase in the heating load, the space temperature decreases to move the slider 55 to the right in the direction indicated by the character C. In view of the above referred to parallel relationship, this causes partial short-circuiting of the relay coil 59 to decrease the energization thereof and increase the energization of the relay coil 58. These unequal energizations of the relay coils 58 and 59 move the switch arm 61 into engagement with the contact 62 to complete a circuit from the line wire 66 through wire 90, switch arm 61, contact 62, wire 91, limit switch 28, wire 92, field winding 24, and wire 93 back to the other line wire 67. Completion of this circuit energizes the field winding 24 to move the valve 16 towards an open position to increase the supply of heat to the space. Operation of the motor 13 to move the valve 16 towards an open position causes left-hand movement of the slider 30 with respect to the balancing potentiometer resistance element 31. This left-hand movement of the slider 30 partially short-circuits the relay coil 58 to decrease the energization thereof and increase the energization of the relay coil 58. When the slider 30 has moved sufficiently far to the left to rebalance the energizations of the relay coils 58 and 59, the switch arm 61 is moved out of engagement with the contact 62 to break the circuit through the field winding 24. In this manner, the valve 16 is modulated toward an open position in direct accordance with the amount of decrease in space temperature.

Upon a decrease in heating load, the space temperature increases to move the slider 55 to the left in the direction indicated by the character H. This causes partial short circuiting of the relay coil 58 to decrease the energization thereof and increase the energization of the relay coil 59. As a result, the switch arm 61 is moved into engagement with the contact 63 to complete a circuit from the line wire 66 through wire 90, switch arm 61, contact 63, wire 94, limit switch 27, wire 95, field winding 25, and wire 93 back to the other line wire 67. Completion of this circuit energizes the field winding 25 to move the valve 16 towards a closed position. Operation of the motor 13 to move the valve 16 towards a closed position causes right-hand movement of the slider 30 with respect to the balancing potentiometer resistance element 31. This causes partial short circuiting of the relay coil 59 to decrease the energization thereof and increase the energization of the relay coil 58. When the slider 30 has moved sufficiently far to the right to rebalance the energization of the relay coils 58 and 59, the switch arm 61 is moved out of engagement with the contact 63 to break the circuit through the field winding 25. In this manner, the valve 16 is moved toward a closed position in direct accordance with the amount of increase in space temperature.

From the above, it is seen that there is provided a follow-up system of the electrical type for positioning the valve 16 in accordance with deviations in space temperature. It is found that if the control range of the control potentiometer is made sufficiently narrow to give accurate temperature control "hunting" is likely to occur. If the control range is made sufficiently wide to prevent "hunting", a "droop" is likely to occur. That is, the space temperature is maintained at a lower value when the heating load is relatively great than when the heating load is relatively light. In order to eliminate "hunting" and this "drooping" characteristic of the follow-up system, the reset or load compensation mechanism generally designated at 15 is utilized. The operation of the reset mechanism in combination with the follow-up control system is as follows.

Upon an increase in heating load, the space temperature decreases to move the slider 55 to the right in the direction indicated by the character C. This increases the energization of the relay coil 58 and decreases the energization of the relay coil 59 to move the valve 16 towards an open position. As the valve 16 is moved toward an open position, the slider 30 of the balancing potentiometer is moved to the left to rebalance the relay 12 and in this manner the valve 16 is modulated toward an open position in accordance with the amount of decrease in space temperature. As the valve 16 is moved toward the open position, the spring 39 is placed in tension to cause downward movement of the slider 42, this downward movement of the slider 42, however, being retarded by the clock escapement mechanism. As the slider 42 moves downwardly, the relay coil 59 is partially short-circuited to decrease the energization thereof and increase the energization of relay coil 58. As a result of these unequal energizations of the relay coils 58 and 59 the valve 16 is moved further towards an open position and the rate at which this valve is so moved further towards the open position is dependent upon the rate of downward movement of the slider 42 of the compensating potentiometer. As the valve 16 is moved further towards the open position, the slider 30 is moved further towards the right to rebalance the energizations of the relay coils 58 and 59. As long as the space temperature is less than the desired normal value, the valve 16 will continue further in its opening movement to supply additional heat to the space to make up for the increase in heating load. When the slider 55 of the control potentiometer returns to the mid position, the relay 12 will become rebalanced and the valve 16 will be maintained in its newly adjusted position. In other words, the valve 16 is repositioned or reset with respect to the temperature of the space in accordance with the amount of increase in the heating load.

Upon a decrease in the heating load, the space temperature increases to move the slider 55 to the left. This decreases the energization of the relay coil 58 and increases the energization of the relay coil 59 to move the valve 16 towards a closed position. Movement of the valve 16 towards a closed position also causes right-hand movement of the slider 30 of the balancing potentiometer to rebalance the relay 12. In this manner, the valve 16 is moved toward a closed position in accordance with the amount of increase in space temperature. Operation of the motor 13 to move the valve 16 toward a closed position places the spring 39 in compression which moves the slider 42 of the compensating potentiometer upwardly. This upward movement of the slider 42, however, is retarded by the clock escapement mechanism. Upward movement of the slider 42 partially short-circuits the relay coil 58 to decrease the energization thereof and increase the energization of the relay coil 59. As a result of these unequal energizations, the valve 16 is moved further towards a closed position and the slider 30 is moved to the right to rebalance the energizations of the relay coils 58 and 59. As long as the space temperature is greater than the desired normal value, the valve 16 will be continued in its closing movement at a rate corresponding with the upward movement of the slider 42 of the compensating potentiometer. In this manner, the supply of heat to the space is additionally decreased to compensate for the decrease in heating load. When the space temperature returns to the desired normal value as a result of this additional decrease in the heat supplied to the space, the relay 12 becomes balanced and the valve 16 is maintained in its newly adjusted position with respect to the position of the slider 55 of the control potentiometer. In other words, the valve 16 is repositioned or reset with respect to the value of the space temperature in accordance with the amount of decrease in the heating load.

By reason of the above construction, the space temperature is maintained at a substantially constant value regardless of changes in load and if the clock escapement mechanism is properly adjusted, "hunting" and "drooping" are entirely eliminated. It is also seen that the farther the space temperature deviates from the desired normal value the farther the motor 13 will operate and the more tension or compression is placed in the spring 39. This increased tension or compression in the spring 39 tends to make the clock escapement mechanism operate faster and, therefore, the rate of reset will be greater when the space temperature deviates a relatively great amount from the desired normal value than when it deviates a smaller amount. By suitably adjusting the weight 52, the rate of reset for any given deviation of the space temperature may be adjusted.

Although for purposes of illustration I have disclosed one form of my invention, other forms thereof may become obvious to those skilled in the art upon reference to the accompanying specification and, therefore, this invention is to be limited only by the scope of the appended claims and prior art.

I claim as my invention:

1. A reset mechanism for a device which controls the value of a condition, comprising in combination. a stationary member, a movable member movable with respect to the stationary member for performing the reset function, resilient means operated by said device for moving the movable member and means for retarding movement of the movable member.

2. A reset mechanism for a device which controls the value of a condition, comprising in combination, a stationary member, a movable member movable with respect to the stationary member for performing the reset function, resilient means operated by said device for moving the movable member and means for retarding movement of the movable member, said last mentioned means including an escapement mechanism operatively connected to said movable member.

3. In combination, a device to be positioned in a plurality of positions for controlling the value of a condition, control means the state of which is varied in accordance with changes in the value of the condition to be controlled and having a desired normal value of the condition, follow-up means operated by the device, mechanism controlled by said control means and said follow-up means for positioning said device in accordance with changes in the state of the control means to maintain the condition within certain limits, compensating means separate from the follow-up means for also controlling said mechanism, a resilient connection between said compensating means and said device for operating the compensating means upon operation of the device, and a clock escapement mechanism for retarding the operation of the compensating means by the device additionally and gradually to position the device with respect to the state of the control means for returning the value of the condition toward normal.

4. In combination, a device to be positioned in a plurality of positions for controlling the value of a condition, control means the state of which is varied in accordance with changes in the value of the condition to be controlled and having a desired normal state corresponding to a desired normal value of the condition, follow-up means operated by the device, mechanism controlled by said control means and said follow-up means for positioning said device in accordance with changes in the state of the control means to maintain the condition within certain limits, compensating means separate from the follow-up means and including a stationary member and a movable member cooperating therewith for also controlling the mechanism, a resilient connection between the device and the movable member for moving the movable member upon operation of the device, and means for retarding movement of the movable member by the device additionally and gradually to position the device with respect to the state of the control means for returning the value of the condition toward normal.

5. In combination, a device to be positioned in a plurality of positions for controlling the value of a condition, control means the state of which is varied in accordance with changes in the value of the condition to be controlled and having a desired normal state corresponding to a desired normal value of the condition, follow-up means operated by the device, mechanism controlled by said control means and said follow-up means for positioning said device in accordance with changes in the state of the control means to maintain the condition within certain limits, compensating means separate from the follow-up means and including a stationary member and a movable member cooperating therewith for also controlling the mechanism, a resilient connection between the device and the movable member for moving the movable member upon operation of the device, and a clock escapement mechanism for retarding movement of the movable member by the device additionally and gradually to position the device with respect to the state of the control means for returning the value of the condition toward normal.

6. In combination, a device to be positioned in a plurality of positions for controlling the value of a condition, control impedance means adjusted in accordance with changes in the value of the condition to be controlled and having a desired adjustment corresponding to a desired normal value of the condition, follow-up means operated by the device, mechanism controlled by said control impedance means and said follow-up means for positioning said device in accordance with changes in the adjustment of the control impedance means to maintain the condition within certain limits, compensating impedance means separate from the follow-up means for also controlling said mechanism, a resilient connection between said compensating impedance means and said device for adjusting the compensating impedance means upon operation of the device, and a clock escapement mechanism for retarding the operation of the compensating impedance means by the device additionally and gradually to position the device with respect to the adjustment of the control impedance means for returning the value of the condition toward normal.

7. In combination, a device to be positioned in a plurality of positions for controlling the value of a condition, control impedance means adjusted in accordance with changes in the value of the condiiton to be controlled and having a desired adjustment corresponding to a desired normal value of the condition, follow-up means operated by the device, mechanism controlled by said control impedance means and said follow-up means for positioning said device in accordance with changes in the adjustment of the control impedance means to maintain the condition within certain limits, compensating impedance means separate from the follow-up means and including a stationary member and a movable member cooperating therewith for also controlling the mechanism, a resilient connection between the device and the movable member for moving the movable member upon operation of the device, and means for retarding movement of the movable member by the device additionally and gradually to position the device with respect to the adjustment of the control impedance means for returning the value of the condition toward normal.

8. In combination, a device to be positioned in a plurality of positions for controlling the value of a condition, control impedance means adjusted in accordance with changes in the value of the condition to be controlled and having a desired adjustment corresponding to a desired normal value of the condition, follow-up means operated by the device, mechanism controlled by said control impedance means and said follow-up means for positioning said device in accordance with changes in the adjustment of the control impedance means to maintain the condition within certain limits, compensating impedance means separate from the follow-up means and including a stationary member and a movable member cooperating therewith for also controlling the mechanism, a resilient connection between the device and the movable member for moving the movable member upon operation of the device, and a clock escapement mechanism for retarding movement of the movable member by the device additionally and gradually to position the device with respect to the adjustment of the control impedance means for returning the value of the condition toward normal.

9. In combination, a device to be positioned in a plurality of positions for controlling the value of a condition, control impedance means adjusted in accordance with changes in the value of the condition to be controlled and having a desired adjustment corresponding to a desired normal value of the condition, balancing impedance means operated by the device, mechanism controlled by said control impedance means and said balancing impedance means for positioning said device in accordance with changes in the adjustment of the control impedance means to maintain the condition within certain limits, compensating impedance means separate from the balancing impedance means for also controlling said mechanism, a resilient connection between said compensating impedance means and said device for adjusting the compensating impedance means upon operation of the device, and a clock escapement mechanism for retarding the operation of the compensating impedance means by the device additionally and gradually to position the device with respect to the adjustment of the control impedance means for returning the value of the condition toward normal.

10. In combination, a device to be positioned in a plurality of positions for controlling the value of a condition, control impedance means adjusted in accordance with changes in the value of the condition to be controlled and having a desired adjustment corresponding to a desired normal value of the condition, balancing impedance means operated by the device, mechanism controlled by said control impedance means and said balancing impedance means for positioning said device in accordance with changes in the adjustment of the control impedance means to maintain the condition within certain limits, compensating impedance means separate from the balancing impedance means and including a stationary member and a movable member cooperating therewith for also controlling the mechanism, a resilient connection between the device and the movable member for moving the movable member upon operation of the device, and means for retarding movement of the movable member by the device additionally and gradually to position the device with respect to the adjustment of the control impedance means for returning the value of the condition toward normal.

11. In combination, a device to be positioned in a plurality of positions for controlling the value of a condition, a control potentiometer adjusted in accordance with changes in the value of the condition to be controlled and having a desired adjustment corresponding to a desired normal value of the condition, a balancing potentiometer operated by the device, mechanism controlled by said control potentiometer and said balancing potentiometer for positioning said device in accordance with changes in the adjustment of the control potentiometer to maintain the condition within certain limits, a compensating potentiometer separate from the balancing potentiometer for also controlling said mechanism, a resilient connection between said compensating potentiometer and said device for adjusting the compensating potentiometer upon operation of the device, and a clock escapement mechanism for retarding the operation of the compensating potentiometer by the device additionally and gradually to position the device with respect to the adjustment of the control potentiometer for returning the value of the condition toward normal.

12. In combination, a device to be positioned in a plurality of positions for controlling the value of a condition, a control potentiometer adjusted in accordance with changes in the value of the condition to be controlled and having a desired adjustment corresponding to a desired normal value of the condition, a balancing potentiometer operated by the device, mechanism controlled by said control potentiometer and said balancing potentiometer for positioning said device in accordance with changes in the adjustment of the control potentiometer to maintain the condition within certain limits, a compensating potentiometer separate from the balancing potentiometer and including a stationary member and a movable member cooperating therewith for also controlling the mechanism, a resilient connection between the device and the movable member for moving the movable member upon operation of the device, and means for retarding movement of the movable member by the device additionally and gradually to position the device with respect to the adjustment of the control potentiometer for returning the value of the condition toward normal.

WILLIAM L. McGRATH.